United States Patent
Uriel

(10) Patent No.: US 11,431,732 B2
(45) Date of Patent: Aug. 30, 2022

(54) METHODS AND SYSTEM FOR PACKET CONTROL AND INSPECTION IN CONTAINERS AND MESHED ENVIRONMENTS

(71) Applicant: CHECK POINT SOFTWARE TECHNOLOGIES LTD., Tel Aviv (IL)

(72) Inventor: Ilan Uriel, Reut (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 329 days.

(21) Appl. No.: 16/503,515

(22) Filed: Jul. 4, 2019

(65) Prior Publication Data
US 2021/0006569 A1    Jan. 7, 2021

(51) Int. Cl.
*H04L 9/40* (2022.01)
*H04L 43/028* (2022.01)
*G06F 9/455* (2018.01)

(52) U.S. Cl.
CPC ........ *H04L 63/1408* (2013.01); *H04L 43/028* (2013.01); *G06F 9/455* (2013.01)

(58) Field of Classification Search
CPC ...... H04l 63/1408; H04l 43/028; H04l 41/40; H04l 43/20; H04l 63/0245; H04l 63/0227; H04l 63/0272; H04l 63/166; H04l 41/046; G06F 9/45558; G06F 2009/45587; G06F 9/455
See application file for complete search history.

(56) References Cited

U.S. PATENT DOCUMENTS

| | | | |
|---|---|---|---|
| 9,959,111 B2* | 5/2018 | Plate | G06F 8/65 |
| 10,691,480 B2* | 6/2020 | Do | G06F 9/45529 |
| 2003/0237065 A1* | 12/2003 | Matsuzaki | G06F 30/3323 |
| | | | 716/107 |
| 2008/0243696 A1* | 10/2008 | LeVine | G06F 21/42 |
| | | | 705/53 |
| 2016/0381075 A1* | 12/2016 | Goyal | G06F 21/64 |
| | | | 713/176 |
| 2017/0212830 A1* | 7/2017 | Thomas | G06F 11/3668 |
| 2018/0129803 A1* | 5/2018 | Levin | G06F 21/54 |
| 2019/0156023 A1* | 5/2019 | Gerebe | G06F 21/44 |
| 2019/0342187 A1* | 11/2019 | Zavesky | H04L 43/50 |

(Continued)

*Primary Examiner* — Thu V Nguyen
*Assistant Examiner* — Aye M Aung
(74) *Attorney, Agent, or Firm* — Mark M. Friedman

(57) ABSTRACT

An instantiated application includes both a runtime instantiation of an application image, and an administrative service operable to install in the instantiated application at least one security module during runtime of the instantiated application in a container. Prior to runtime, a design time agent can access the application image in a repository, examine the application image, and based on the examining, adding at least one security module to the application image prior to instantiation. During runtime, a runtime agent can query parameters of the container, such as static and dynamic variables available on the machine on which the container is running. The runtime agent processes these parameters in conjunction with predefined rules to determine an action such as starting, stopping, adding, and/or changing the security module, such as the method of packet inspection.

12 Claims, 5 Drawing Sheets

(56) References Cited

U.S. PATENT DOCUMENTS

2019/0354389 A1* 11/2019 Du ..................... G06F 9/45545
2020/0065124 A1*  2/2020 Chen ................... G06F 9/45558
2020/0358870 A1* 11/2020 Flynn .................... H04L 67/36

* cited by examiner

METHODS AND SYSTEM FOR PACKET CONTROL AND INSPECTION IN CONTAINERS AND MESHED ENVIRONMENTS

FIELD OF THE INVENTION

The present invention generally relates to computer security, and in particular, it concerns security of operating system level virtualization implementations.

BACKGROUND OF THE INVENTION

Preventing harmful network traffic involves the process of inspecting network packets and blocking any packet, or sets of packets, which might cause damage. There are various technical ways to intercept a packet, prior to the packet's arrival to the destined application, arriving from a source and decide if the packet has to be blocked, altered, or can proceed. Conventional security implementations include:
- A traditional gateway at the entry point of the organization network examines the packets before the packets are routed to destinations inside the network.
- A proxy may inspect packets by acting as a broker between a source and a destination and examine packets before serving the packets to the proxy's respective consumers.
- A preloaded library can hook various kernel calls or C library calls, in order to examine network function parameters before allowing the function to proceed and execute.

Until the arrival of dynamic platforms, such as the cloud and dynamic deployment frameworks, such as Kubernetes and Docker, choosing one of the above methods to intercept packets, was a simple decision, involving the specific role of a computer in a datacenter and weighing the pros and cons of every such method as per statically, rarely changing, environment and deployment circumstances.

For example, an organization's firewall would be connected at the network entry point as a dedicated packet inspection machine. A reverse proxy in charge of routing and secure socket layer (SSL) termination could also inspect packets as an additional filter layer before sending the packets into the organization's network.

Current computing environments are much more challenging, as modern environments present unpredicted conditions and landscape, in which a specific application will be hosted. Some of these circumstances are:
- A cloud provider can host a container in various environments, where some provide administrative access and others do not, therefore rendering some mechanism, such as C library hooking unpredictable in their ability to work effectively
- A network policy can be managed by a meshing framework, which disables or overloads any attempt to control the flow of packets by any third entity.
- Container components, including operating system (OS), drivers, C libraries, and applications can change dynamically. For example, by redeployment in different datacenters that are subject to various configurations and/or limitations, which can render a specific security inspection effective in one datacenter and useless in another.

The following example, demonstrates how a traditional protection practice may fail in a modern environment. A kernel module is attached to a network code, which intercept packets that arrive to a network card. This module is designed to run on a container, which hosts a Web server, and inspect packets arriving and leaving the container. Loading the Kernel module requires privileged access to the container host. The container deployed in Amazon EC2 and everything works perfectly. At a later stage, a cluster is formed and the container joins is repositioned in AWS Fargate, an environment that does not provide privileged access to a host. At this point the Kernel module will be disabled and in many cases with no indication that the kernel module failed to load. Naively, the system administrator will regard absence of any security warnings events to a threat free environment.

In many cases, the solution to this problem comes in the form of using a mechanism that fits all environments, such as adding a sidecar or a proxy that controls the flow of the packet. However, such a solution does not come without a price: Every mechanism has a different influence on performance and resources. A proxy for example, adds much more latency due to intensive memory copying and consumes substantial amounts of RAM, while a C library hook, performs no memory copy at all and consumes almost negligible amount of memory. Therefore, a method that can be deployed with lowest latency, resources and performance costs, for every case is very much desired and preferred over a method, which suites all cases and reduces efficiency more than the minimum required.

Referring to FIG. 1, there is shown diagrams of containerization and virtual machine implementation. In containerization 120, containers 122 include one or more applications 124, although typical implementation is one application per container. In the current figure, exemplary container 122A contains exemplary application 124A, container 122B contains exemplary application 124B, and container 122C contains exemplary applications 124C and 124D. The containers 122 run on top of a container management layer shown as Docker 128 that interfaces with the operating system 110 running on a physical server 112 (also referred to as "hardware" and "machine". In computing, a container is generally an isolated user space in which computer programs run directly on the host operating system's (OS) kernel, but have access to a restricted subset of the OS's resources. This method by which a host OS runs programs in an isolated user-space is called containerization or OS-level virtualization. With containers the kernel allows the existence of multiple isolated user-space instances. Containers share the operating system with the host. This is referred to in the field as containers (Docker), virtual environments (VEs), virtual kernel (DragonFly BSD) or jails.

A computer program running on an ordinary operating system can see all resources (connected devices, files and folders, network shares, CPU power, quantifiable hardware capabilities in accordance with their user and group permissions) of that computer. However, programs running inside of a container can only see the container's contents and devices assigned to the container.

In virtual machine (VM) implementation 100 virtual machines 102 contain both applications 104 and (guest) operating systems 106. In the current figure, exemplary VM 102A contains exemplary application 104A and exemplary guest OS 106A, VM 102B contains exemplary application 104B exemplary guest OS 106B, and VM 102C contains exemplary application 104C and exemplary guest OS 106C. The VMs 100 run on top of a management layer shown as hypervisor 108 that interfaces with the operating system 110 running on a physical server 112. A virtual machine (VM), in contrast to a container, creates an isolated operating system, and the programs running in the user-space are applications on top of the isolated OS. Applications running in virtual machines, apart from the hypervisor, require a full instance of the operating system and any supporting libraries.

SUMMARY

An agent constantly monitors, in design time, if a container in conjunction with applications running on the container is implementing security for the container, such as inspecting packets. A runtime agent monitors to verify, during runtime, if the container is actively implementing security, such as inspecting packets, or an additional entity is inspecting packets for the container. According to monitoring results, the agent may dynamically change the security method, such as packet inspection methods, redeploy a container, or alter a meshing topology, in order to meet requirements necessary to deploy an alternate packet inspection method, all in accordance with additional set of business pre-defined rules, such as latency, efficiency, access rights, running application topology, and preferences.

According to the teachings of the present embodiment there is provided a system for securing a container, the system including: an instantiated application including: a runtime instantiation of an application image, and an administrative service having administrator access to the instantiated application, the administrative service operable to install in the instantiated application at least one security module during runtime of the instantiated application in the container.

In an optional embodiment, the administrative service is further operable to execute upon instantiation of the instantiated application. In another optional embodiment, the administrative service is further operable to terminate execution of one or more security modules. In another optional embodiment, the administrative service is operable to install in the instantiated application a plurality of security modules, the plurality of security modules defending a same security vector, the plurality of security modules each of different technical structure, where each technical structure is optimized for specific circumstances of running the instantiated application.

In another optional embodiment, the at least one security module is for packet inspection. In another optional embodiment, the system further includes an additional container in operational communication with the container and configured as an external sidecar in a meshing or a workflow framework.

In another optional embodiment, the at least one security module is implemented by a technique selected from the group consisting of: A C library network API hooking in a Linux environment via LD_PRELOAD mechanism, a kernel module for iptables, a kernel module for nftables, an Envoy proxy, and an Nginx proxy.

In another optional embodiment, the instantiated application further includes: a runtime agent querying parameters of the container.

In another optional embodiment, the runtime agent is operable during runtime of the instantiated application to dynamically execute one or more functions selected from the group consisting of: invoke at least one preinstalled security module, reconfigure the security module in accordance with the queried parameters, retire at least one the security module upon monitoring an event which renders at least one the security module invalid, execute a method for downloading from a remote computer, installing, and executing a new security module, install or deploy an external machine, functioning as a sidecar and configure a meshing framework, for routing other machines packets for inspection prior to routing the packets to the packet's destination, install or deploy an external machine, functioning as a sidecar and configure a workflow framework, for routing other machines packets for inspection prior to routing the packets to the packet's destination, and reconfigure priorities for deploying at least one the security module in accordance with predefined priority rules, local, or remote rules engine.

In another optional embodiment, the instantiated application is running on a machine, and one or more of the parameters are selected from the group consisting of: a cloud provider on which the machine is installed, a region in which the machine is installed, a cloud provider service on which the machine is installed, available ACL for invoking an instance of the machine, if the machine is part of a cluster, if the machine is managed by a meshing system, if the machine is managed by a workflow system, applications and services running on the machine, network protocols and ports at runtime, encryption methods used for network in runtime, and system and C libraries versions.

In another optional embodiment, the runtime agent processes the parameters in conjunction with predefined rules to determine an action selected from the group consisting of: if a specific inspection method should be installed, if a specific inspection method should be retired, if a specific inspection method should be reconfigured, and if a specific inspection method should be deployed.

In another optional embodiment, the system further includes a design time agent operable for: accessing an application image, examining the application image, and adding, based on the examining, an administrative service to the application image, the administrative service having administrator access to an instantiated application of the application image, and the administrative service operable to install in the instantiated application at least one security module during runtime of the instantiated application in the container.

According to the teachings of the present embodiment there is provided a system for securing a container, the system including: a design time agent operable for: accessing an application image, examining the application image, and adding, based on the examining, an administrative service to the application image, the administrative service having administrator access to an instantiated application of the application image, and the administrative service operable to install in the instantiated application at least one security module during runtime of the instantiated application in the container.

In another optional embodiment, the application image is selected from the group consisting of: a container image to be instantiated as the instantiated application, and a container image file system to be altered in order to provide the instantiated application.

In another optional embodiment, the adding gives administrator access by a technique selected from the group consisting of: altering original image files, altering original image instance access rights credentials, and altering original image instance accounts.

In another optional embodiment, the design time agent additionally is operable for: based on the examining, adding the at least one security module to the application image, the adding at a time selected from the group consisting of: prior to instantiation, and after instantiation.

In another optional embodiment, the design time agent prioritizes which the at least one security module to add based on a pre-defined set of rules. In another optional embodiment, the predefined set of rules includes configuration preferences, such as prioritizing speed and prioritizing less intrusive operating system mechanism. In another optional embodiment, the predefined set of rules includes rules to invoke the configuration of the application image to execute the at least one security module as the application image is instantiated and starts running, in accordance with the placement of the container and framework, which manages the container. In another optional embodiment, the design time agent adds an additional layer to the application image, the additional layer containing a runtime agent operable to control the at least one security module.

According to the teachings of the present embodiment there is provided a method for securing a container, the method including the steps of: accessing an application image, examining the application image, and adding, based on the examining, an administrative service to the application image, the administrative service having administrator access to an instantiated application of the application image, and the administrative service operable to install in the instantiated application at least one security module during runtime of the instantiated application in the container.

In another optional embodiment, the application image is selected from the group consisting of: a container image to be instantiated as the instantiated application, and a container image file system to be altered in order to provide the instantiated application.

In another optional embodiment, the adding gives administrator access by a technique selected from the group consisting of: altering original image files, altering original image instance access rights credentials, and altering original image instance accounts.

In another optional embodiment, the based on the examining, adding the at least one security module to the application image, the adding at a time selected from the group consisting of: prior to instantiation, and after instantiation.

In another optional embodiment, the at least one security module to add is prioritized based on a pre-defined set of rules. In another optional embodiment, the predefined set of rules includes configuration preferences, such as prioritizing speed and prioritizing less intrusive operating system mechanism. In another optional embodiment, the predefined set of rules includes rules to invoke the configuration of the application image to execute the at least one security module as the application image is instantiated and starts running, in accordance with the placement of the container and framework, which manages the container.

In another optional embodiment, an additional layer is added to the application image, the additional layer containing a runtime agent operable to control the at least one security module.

According to the teachings of the present embodiment there is provided a system for securing a container, the system including: a processing system containing one or more processors, the processing system being configured to: access an application image, examine the application image, and add, based on the examining, an administrative service to the application image, the administrative service having administrator access to an instantiated application of the application image, and the administrative service operable to install in the instantiated application at least one security module during runtime of the instantiated application in the container.

According to the teachings of the present embodiment there is provided a non-transitory computer-readable storage medium having embedded thereon computer-readable code for securing a container, the computer-readable code including program code for: accessing an application image, examining the application image, and adding, based on the examining, an administrative service to the application image, the administrative service having administrator access to an instantiated application of the application image, and the administrative service operable to install in the instantiated application at least one security module during runtime of the instantiated application in the container.

According to the teachings of the present embodiment there is provided a computer program that can be loaded onto a computer connected through a network, so that the computer running the computer program constitutes a design time agent.

BRIEF DESCRIPTION OF FIGURES

The embodiment is herein described, by way of example only, with reference to the accompanying drawings, wherein.

ABBREVIATIONS AND DEFINITIONS

Figure 1:
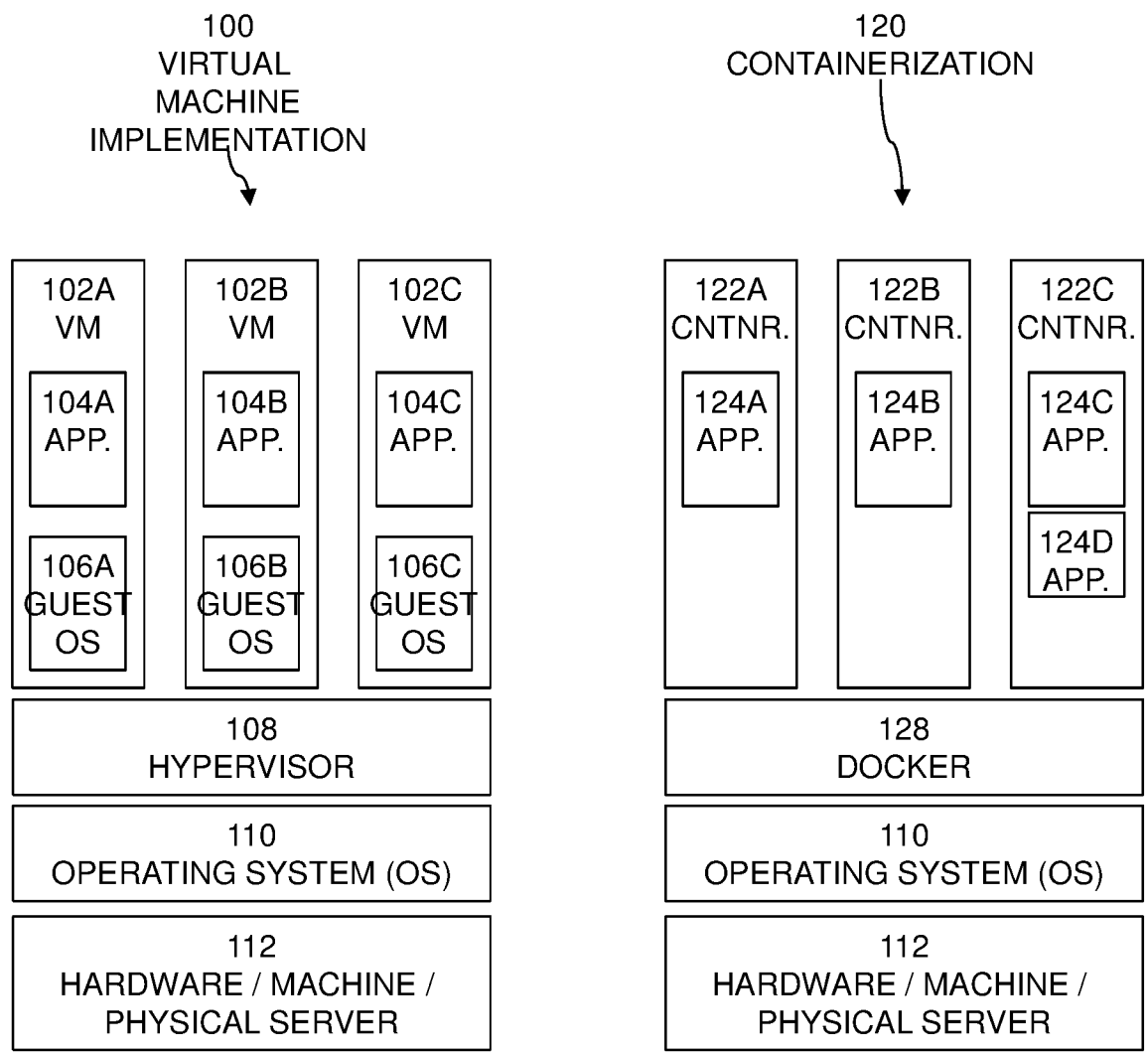
FIG. 1, diagrams of containerization and virtual machine implementation.

For convenience of reference, this section contains a brief list of abbreviations, acronyms, and short definitions used in this document. This section should not be considered limiting. Fuller descriptions can be found below, and in the applicable Standards.

ACL—Access control list
API—Application Programming Interface
AWS—Amazon Web Services. A cloud computing platform provided by Amazon providing a mix of infrastructure as a service (IaaS), platform as a service (PaaS) and packaged software as a service (SaaS) offerings
AWS Fargate—A compute engine for Amazon ECS that allows you to run containers without having to manage servers or clusters
Docker—An open source project that facilitates deployment of applications inside of software containers
EC2—Amazon Elastic Compute Cloud (Amazon EC2) is a web service that provides secure, resizable compute capacity in the cloud.
FW—firewall
IaaS—Infrastructure as a service
OS—operating system
PaaS—Platform as a service
SaaS—Software as a service
SSL—Secure Sockets Layer, a cryptographic protocol used for network traffic
VM—Virtual machine

DETAILED DESCRIPTION—FIRST EMBODIMENT—FIGS. 1 TO 5

The principles and operation of the system and method according to a present embodiment may be better understood with reference to the drawings and the accompanying description. A present invention is a system for security of OS-level virtualization, in particular for securing containers. The system facilitates packet level inspection of containerized implementations.

The system includes an instantiated application that includes both a runtime instantiation of an application image, and an administrative service operable to install in the instantiated application at least one security module during runtime of the instantiated application in a container. Typically, prior to runtime, a design time application (design time agent) can access the application image in a repository, examine the application image, and based on the examining, adding at least one security module to the application image prior to instantiation. During runtime, a runtime agent can query parameters of the container, such as static and dynamic variables, applications running, listening ports, and running executables linked libraries on the machine on which the container is running. The runtime agent processes these parameters in conjunction with predefined rules to determine an action such as starting, stopping, installing, adding, and/or changing the security module, such as the method of packet inspection.

The present embodiment improves functioning of existing systems, including computers on which containers implemented. Cyber security is inherently done with and on computers, and which by definition improves computing technology. The present embodiment provides and generates cyber security elements. The present system and method are a practical application, in particular providing specific configurations and steps for innovations in securing containers (OS-level virtualization).

The design time agent, administrative service, and runtime agent of the current embodiment are directed to the way computers operate, as they improve the functioning of computers and computer networks. By presenting the design time agent and the runtime agent that choose one of many available security mechanisms based on technical, environmental, and business rules priorities, a best method of implementation of a module, particularly a security module, can be deployed. In contrast, predefined, static security modules come with an expensive price: Every mechanism has different influence on performance and resources. A proxy for example, adds much more latency due to intensive memory copying and consumes substantial amounts of RAM, while a C library hook, performs no memory copy at all and consumes almost negligible amount of memory. Using most suitable solution for each circumstance contributes to minimization of security modules degradation of overall performance and user experience.

Various ways for inspecting packets exist. Some non-limiting examples include LD_PRELOAD is one, reverse proxy is another, and kernel driver is yet a third one. According to circumstances, using one of the methods, will be the only one possible, or preferred due to factors like performance superiority. For example, a statically linked application cannot be intercepted via LD_PRELOAD and a reverse proxy or kernel driver are the remaining options. Furthermore, if such application runs on a non-privileged container, reverse proxy will be the only remaining option, despite being the slowest one technically.

Another option may be a dynamically linked application, which is running in a container with a Check Point nano-agents protection. Depending on the exact protection vector such agent is designated to give, an LD_PRELOAD may be chosen for providing additional packet inspection features, which the nano agent does not provide.

The current embodiment includes a system and methods for choosing a best option, as per technical features, limitations and business consideration, such as weighing a non-kernel intrusive method against a kernel driver and reverse proxy against system calls hooking.

Figure 2:
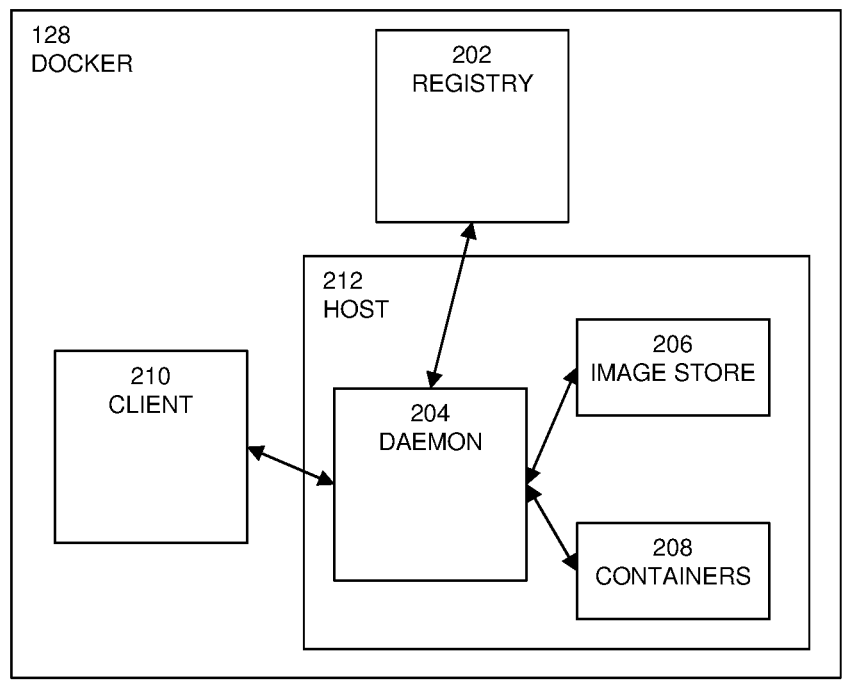
FIG. 2, a reference diagram of Docker architecture.

Referring to FIG. 2, there is shown a reference diagram of Docker architecture. It should be noted that the current implementation is not limited to being implemented in Docker. While the system and method of the current implementation can be used in general for container or traditional virtualization environment, such as VMWare hypervisor, implementation, in this description a non-limiting example of Docker is used.

Docker 128 includes one or more registries, shown as exemplary registry 202. By default, the main registry is the Docker Hub which hosts public and official images. Organizations can also host private registries. A host 212 includes a Docker daemon 204, images 206, and containers 208. Images can be downloaded from the registry 202 explicitly or implicitly when starting a container. Once the image is downloaded the image is cached locally.

Containers 208 are the instances of images—the actual executables. There could be multiple containers running based on the same image. In Docker, "container" also refers to a package of software and dependencies that run inside a virtual user space. files that represents such a package are called a "container image". For simplicity in this description, the term "image" is used, as will be understood by one skilled in the art.

The Docker daemon 204 is responsible for creating, running, and monitoring containers 208. The daemon 204 also takes care of building and storing images 206. A Docker client 210 communicates with the daemon 204.

Figure 3:
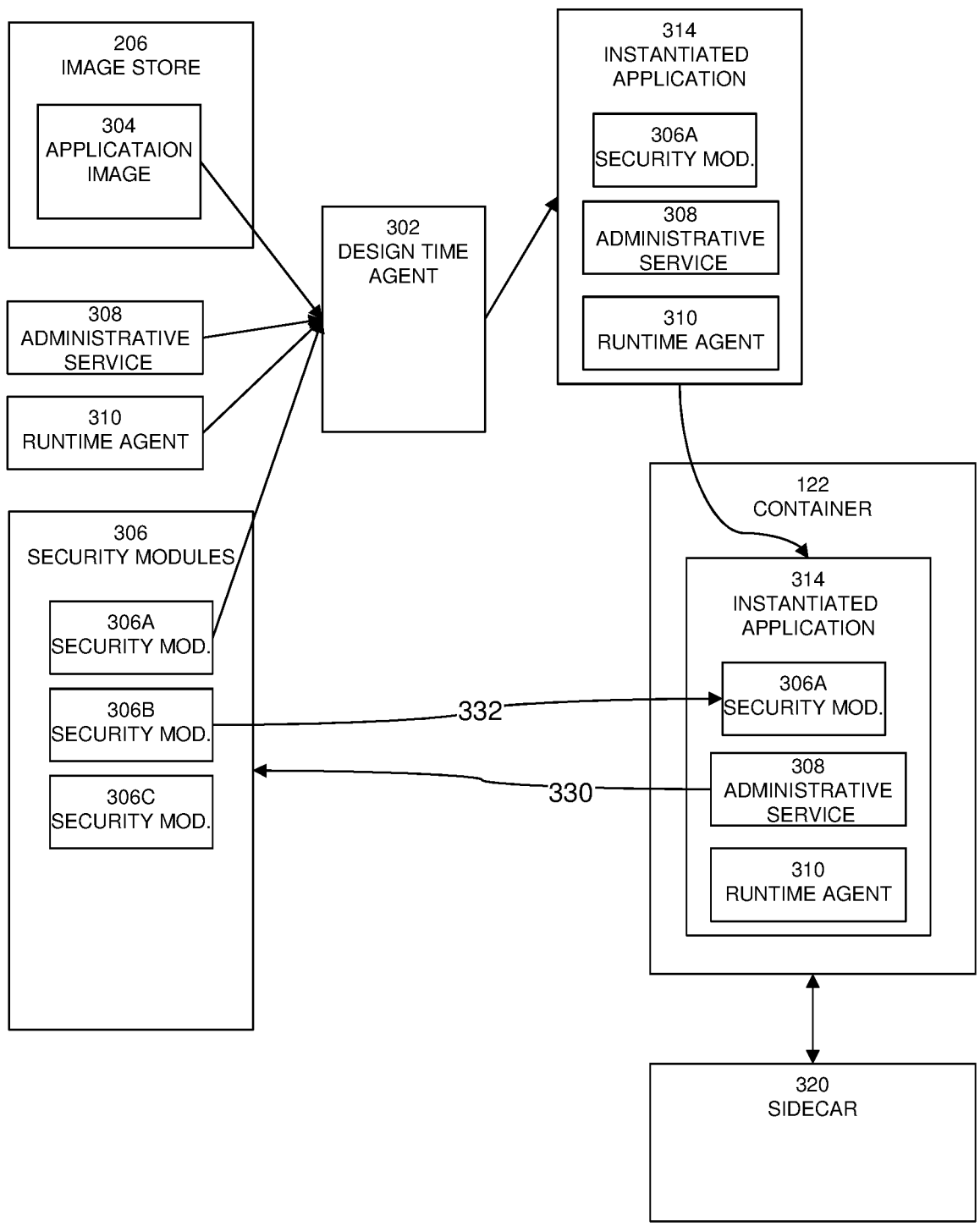
FIG. 3, a system for security of containers.

Referring to FIG. 3, there is shown a system for security of containers. An application image 304 is stored in an image store 206. Alternatively, the application image 304 can be provided from the registry 202 or another location. An administrative service 308 and a runtime agent 310 are available. Security modules 306 include exemplary security modules 306A, 306B, and 306C.

Figure 4:
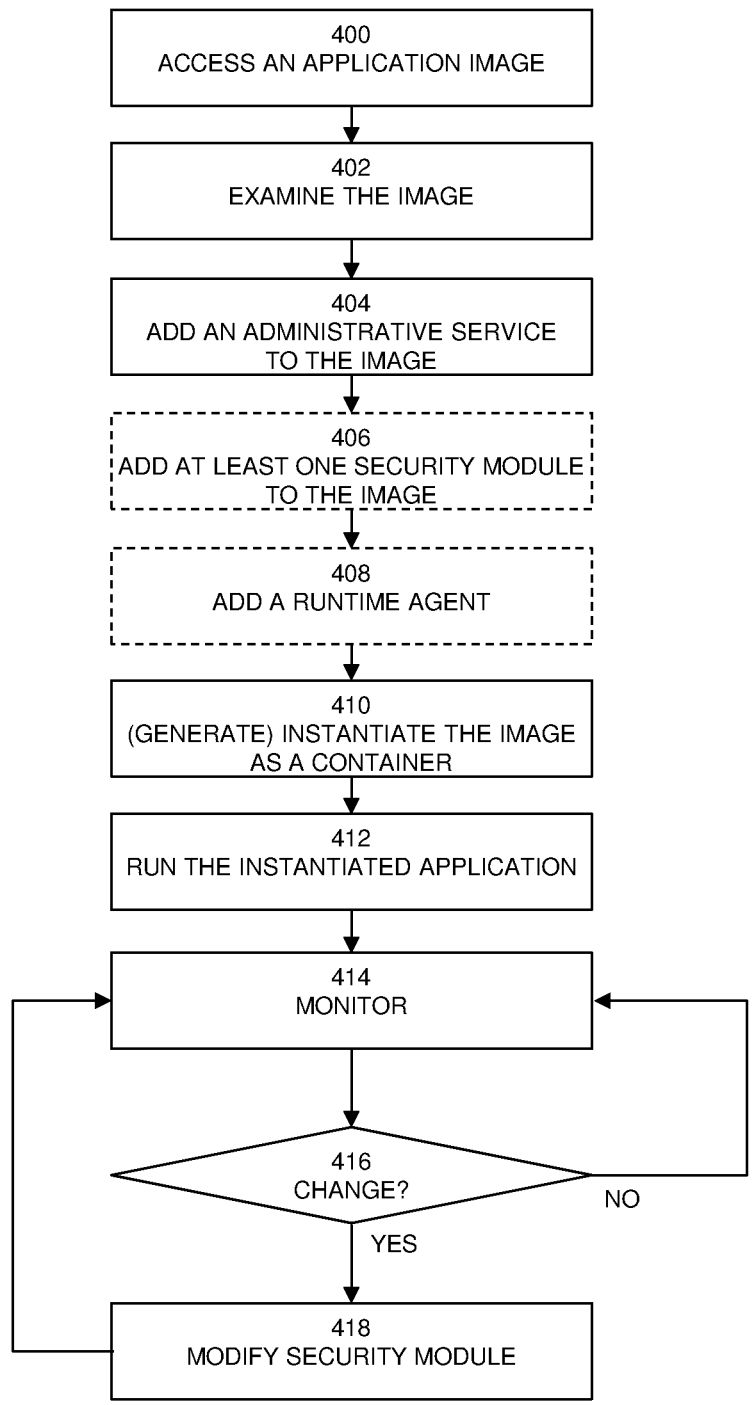
FIG. 4, a flowchart of a method for security of containers.

Refer also to FIG. 4, there is shown a flowchart of a method for security of containers. The method typically begins with a design time agent 302 accessing 400 the application image 304 (in an image store 206 or registry 202). The design time agent alters 404 the application image 304, adding the administrative service 308 to the image. Optionally and typically, the design time agent 302 examines 402 the application image 304. Based on the examination, the design time agent 302 may alter the application image 304 to add 406 at least one security module 306 to the application image 304 prior to instantiation. In the current example, initial security module 306A will be used.

The design time agent 302 can select as the application image 304 a container image to be instantiated as the instantiated application, or a container image file system to be altered in order to provide the instantiated application. In a case where the design time agent 302 examines the application image 304 and finds that there is already available administrator access available to the instantiated application 314, this already available administrator access may be used for the administrative service 308. The design time agent 302 can prioritizes which security module(s) to add based on a pre-defined set of rules (not shown). The pre-defined set of rules can include configuration preferences, such as prioritizing speed and prioritizing less intrusive operating system mechanisms. The predefined set of rules can include rules to invoke the configuration of the application image 304 to execute at least one security module 306 as the application image 304 is instantiated 314 and starts running, in accordance with the placement of the container 122 and framework, which manages the container 122.

The design time agent 302 can add an additional layer to the application image 304. This additional layer can contain a runtime administrative agent (adding 408 a runtime agent) 310 operable to install and/or control at least one security module 306.

The design time agent 302 generates 410 an instantiated application 314. The instantiated application 314 includes a runtime instantiation of an application image (not shown as a separate element in the current figure, as is known to be a part of the instantiated application 314) and the administrative service 308. The instantiated application 314 is run 412 as a container/in a container, as is known in the art.

The administrative service 308 minimally provides administrator access to the instantiated application 314. Administrator access can be added using a technique such altering the original image files (application image 304), altering original image instance access rights credentials, and altering original image instance accounts. The administrative service 308 is operable to install in the instantiated application 314 at least one security module 306 during runtime of the instantiated application 314 in the container 122. The security module 306 runs in the container 122, typically as a process that examines the entire container. The administrative service 308 generally executes upon instantiation of the instantiated application 314, instantiation in this case including running the instantiated application 314. The administrative service 308 is further operable to execute the security module 306A upon instantiation of the instantiated application 314. The administrative service 308 is also operable to terminate execution of one or more security modules 306.

Typically, the security modules 306 are for packet inspection, with the security module 306A being a method for packet inspection.

Optionally, an additional container can be in operational communication with the container 122 and can be configured as an external sidecar 320 in a meshing or a workflow framework. Using the sidecar 320, the functionality of the main container 122 is extended or enhanced by the sidecar 320 container.

The security modules 306 can be implemented by a variety of techniques, including:
- a C library network API hooking in a Linux environment via LD_PRELOAD mechanism,
- a kernel module for iptables,
- a kernel module for nftables,
- an Envoy proxy, and
- an Nginx proxy.

In a typical implementation, the instantiated application 314 also includes the runtime agent 310. The runtime agent 310 generally monitors 414 the running of the instantiated application 314 and can query parameters of the container. The runtime agent 310 can query constantly, periodically, or as-needed various relevant static and dynamic variables as parameters of the system, applications running, listening ports, running executables linked. If the runtime agent 310 determines 416 that a change should be made to the security module(s), the runtime agent 310 can generally modify 418 the security module, executing one or more functions such as:
- invoke at least one preinstalled security module,
- reconfigure the security module in accordance with the queried parameters,
- retire at least one the security module upon monitoring an event which renders at least one the security module invalid,
- execute a method for downloading from a remote computer, installing, and executing a new security module,
- install or deploy an external machine, functioning as a sidecar and configure a meshing framework, for routing other machines packets for inspection prior to routing the packets to the packet's destination,
- install or deploy an external machine, functioning as a sidecar and configure a workflow framework, for routing other machines packets for inspection prior to routing the packets to the packet's destination,
- reconfigure priorities for deploying at least one the security module in accordance with predefined priority rules, local, or remote rules engine.

The instantiated application 314 runs on a machine 112 (hardware/machine/physical server), and one or more of the parameters can include:
- a cloud provider on which the machine is installed,
- a region in which the machine is installed,
- a cloud provider service on which the machine is installed,
- available ACL for invoking an instance of the machine,
- if the machine is part of a cluster,
- if the machine is managed by a meshing system,
- if the machine is managed by a workflow system,
- applications and services running on the machine,
- network protocols and ports at runtime,
- encryption methods used for network in runtime, and
- operating system and C libraries versions.

The runtime agent 310 typically processes the parameters in conjunction with predefined rules to determine an action such as:
- if a specific inspection method should be installed,
- if a specific inspection method should be retired,
- if a specific inspection method should be reconfigured, and
- if a specific inspection method should be deployed.

The current embodiment adapts to an architecture of an existing system the best possible security method in conjunction with pre-defined rules and technical feasibility of each option, rather than integrate one security module, that treats all cases, ignoring the ability to minimize the performance cost involved with the one security module and the potential flow changes of a packet.

The design time agent 302 can directly add files (agents, services, security modules) by injecting the files into an image 304 before instantiating. Alternatively, and/or additionally after instantiating, the administrative service 308 can add files (agents, services, security modules) then commit to create a new image.

In a case where the design time agent 302 has added one or more security modules 306 to the application image 304, the administrative service 308 can execute the security module(s) (exemplary 306A) upon instantiation of the instantiated application 314. If security modules 306 have not been previously added to the instantiated application 314, then upon instantiation and running the administrative service 308 can add one or more security modules 306 to the instantiated application (typically in conjunction with the runtime agent 310).

While the instantiated application 314 is running, the runtime agent 310 monitors the system and may detect that the security module 306A is no longer the optimal security module to use. In this case, the runtime agent 310 communicates with the administrative service 308 to make a runtime change to the instantiated application configuration. This dynamic reconfiguration of the instantiated application allows one or more security modules to be added, executed, inactivated, terminated, and/or removed. In this case, arrow 330 shows the administrative service 308 communicating with the security modules 306 store. Arrow 332 shows new security module 306B being integrated into the running, instantiated application 314.

The change is committed to create an updated image, if necessary. That is, the application image 304 that is now configured with one or more new security modules 306 is committed to form a new version of the original image, a new application image (not shown) which includes the additional security components.

Note that while "agents" are often installed on a same machine as the containers, applications, and modules with which the agents are interacting, this is not limiting, and agents can be installed and run on a different machine. For example, a first machine can run a container 122 with an instantiated application 314, and a second machine can run an associated security module 306.

Similarly, the runtime agent 310 is not necessarily running on the Docker machine or the Docker hosting physical machine. A minimal requirement is for a Docker image (the application image 304) to have installed (by the design time agent 302) a component that can execute instructions of the administrative service 308. The administrative and other agents can be installed on the Docker image or remotely.

Figure 5:
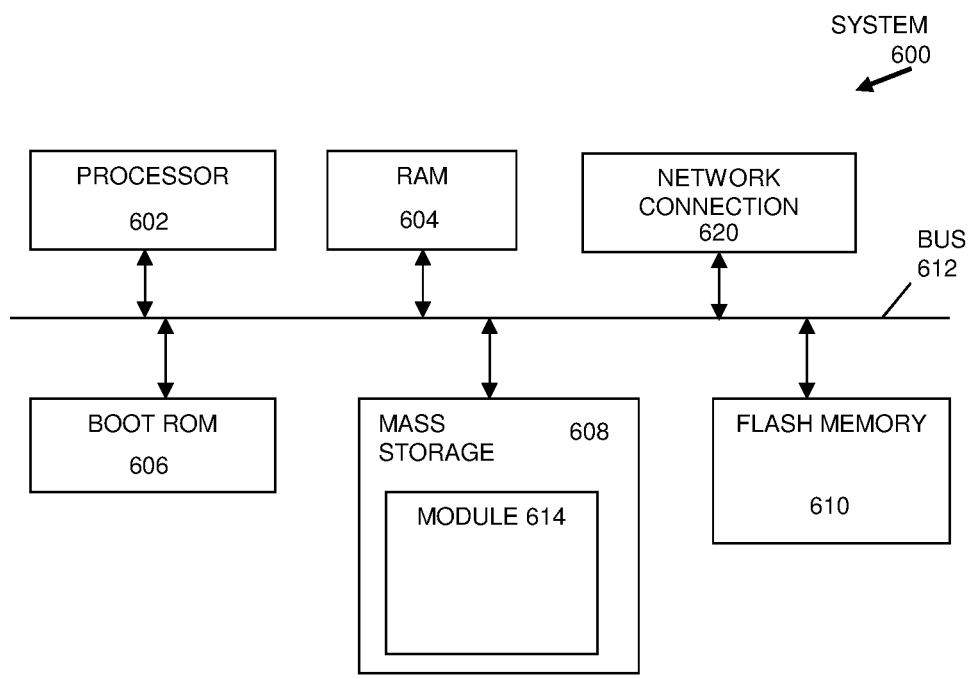
FIG. 5, a high-level partial block diagram of an exemplary system

FIG. 5 is a high-level partial block diagram of an exemplary system 600 configured to implement the system of the present invention. System (processing system) 600 includes a processor 602 (one or more) and four exemplary memory devices: a random-access memory (RAM) 604, a boot read only memory (ROM) 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). The processor 202 is formed of one or more processors, for example, hardware processors, including microprocessors, for performing functions and operations detailed herein. The processors are, for example, conventional processors, such as those used in servers, computers, and other computerized devices. For example, the processors may include x86 Processors from AMD and Intel, Xenon® and Pentium® processors from Intel, as well as any combinations thereof. Any instruction set architecture may be used in processor 602 including but not limited to reduced instruction set computer (RISC) architecture and/or complex instruction set computer (CISC) architecture. A module (processing module) 614 is shown on mass storage 608, but as will be obvious to one skilled in the art, could be located on any of the memory devices.

Mass storage device 608 is a non-limiting example of a non-transitory computer-readable storage medium bearing computer-readable code for implementing the security methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

System 600 can be implemented as a server or client respectively connected through a network to a client or server.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A system for securing a container, the system comprising:
 (a) a non-transitory computer readable storage medium for storing computer components; and
 (b) a processor for executing the computer components comprising:
  (i) a design time agent operable for:
   (1) accessing an application image,
   (2) examining said application image, and
   (3) adding to said application image, based on said examining, an administrative service and a runtime agent, said administrative service having administrator access to an instantiated application of said application image, said runtime agent operable during runtime of said instantiated application in the container to: i) query parameters of the container and process the queried parameters in conjunction with a pre-defined set of rules, and ii) select at least one first security module from a plurality of security modules, and said administrative service configured to operate during runtime of said instantiated application in the container in response to instructions received from said runtime agent based on the processed queried parameters by said runtime agent, wherein the operation of the administrative service includes installing in said instantiated application said at least one first security module.

2. The system of claim 1, wherein said application image is selected from the group consisting of:
  (a) a container image to be instantiated as said instantiated application, and
  (b) a container image file system to be altered in order to provide said instantiated application.

3. The system of claim 1, wherein said adding gives administrator access by a technique selected from the group consisting of:
  (a) altering original image files,
  (b) altering original image instance access rights credentials, and
  (c) altering original image instance accounts.

4. The system of claim 1, wherein said design time agent additionally is operable for:
  based on said examining, adding at least one security module to said application image prior to instantiation.

5. The system of claim 1, wherein said pre-defined set of rules include configuration preferences that include prioritizing speed and prioritizing less intrusive operating system mechanism.

6. The system of claim 1, wherein said pre-defined set of rules includes rules to invoke the configuration of said application image to execute said selected at least one security module as said application image is instantiated and starts running, in accordance with the placement of said container and framework, which manages said container.

7. The system of claim 1, wherein the operation of the administrative service further includes: deactivating the at least one first security module, and installing at least one second security module in response to instructions received from said runtime agent based on the processed queried parameters by said runtime agent.

8. A method for securing a container, the method comprising the steps of:
  accessing, by a design time agent executed by a processor, an application image,
  examining, by said design time agent, said application image, and
  adding to said application image, by said design time agent based on said examining, an administrative service and a runtime agent, said administrative service having administrator access to an instantiated application of said application image, said runtime agent operable during runtime of said instantiated application in the container to: i) query parameters of the container and process the queried parameters in conjunction with a pre-defined set of rules, and ii) select at least one first security module from a plurality of security modules, and said administrative service configured to operate during runtime of said instantiated application in the container in response to instructions received from said runtime agent based on the processed queried parameters by said runtime agent, wherein the operation of the administrative service includes installing in said instantiated application said at least one first security module.

9. The method of claim 8, further comprising:
  based on said examining, adding by said design time agent at least one security module to said application image prior to instantiation.

10. The method of claim 8, wherein said pre-defined set of rules include configuration preferences that include prioritizing speed and prioritizing less intrusive operating system mechanism.

11. The method of claim 8, wherein said pre-defined set of rules includes rules to invoke the configuration of said application image to execute said selected at least one security module as said application image is instantiated and starts running, in accordance with the placement of said container and framework, which manages said container.

12. The system of claim 8, wherein the operation of the administrative service further includes: deactivating the at least one first security module, and installing at least one second security module in response to instructions received from said runtime agent based on the processed queried parameters by said runtime agent.

* * * * *